US008572618B2

(12) United States Patent  
Kand et al.

(10) Patent No.: US 8,572,618 B2  
(45) Date of Patent: Oct. 29, 2013

(54) EVENT DRIVEN CHANGE INJECTION AND DYNAMIC EXTENSIONS TO A BUSINESS PROCESS EXECUTION LANGUAGE PROCESS

(75) Inventors: Khanderao Kand, San Jose, CA (US); Fang Liu, Dracut, MA (US); Bhagat Nainani, Fremont, CA (US); Shailesh Kumar, Littleton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 381 days.

(21) Appl. No.: 12/776,064

(22) Filed: May 7, 2010

(65) Prior Publication Data

US 2011/0276968 A1    Nov. 10, 2011

(51) Int. Cl.
G09F 9/46    (2006.01)

(52) U.S. Cl.
USPC .......................................... 718/102; 719/318

(58) Field of Classification Search
None
See application file for complete search history.

(56) References Cited

U.S. PATENT DOCUMENTS

| | | | |
|---|---|---|---|
| 7,062,749 B2 | 6/2006 | Cyr et al. | |
| 7,603,674 B2 | 10/2009 | Cyr et al. | |
| 2003/0204433 A1* | 10/2003 | Botscheck et al. | 705/9 |
| 2004/0162741 A1* | 8/2004 | Flaxer et al. | 705/7 |
| 2005/0251527 A1* | 11/2005 | Phillips et al. | 707/101 |
| 2006/0074714 A1* | 4/2006 | Aziz et al. | 705/2 |
| 2006/0150156 A1 | 7/2006 | Cyr et al. | |
| 2006/0229924 A1* | 10/2006 | Aron et al. | 705/8 |
| 2007/0266377 A1* | 11/2007 | Ivanov | 717/136 |
| 2008/0115135 A1* | 5/2008 | Behnen et al. | 718/101 |
| 2008/0255909 A1* | 10/2008 | Joshi et al. | 705/8 |
| 2009/0048896 A1* | 2/2009 | Anandan | 705/9 |
| 2010/0057482 A1* | 3/2010 | Radhakrishnan et al. | 705/1 |
| 2010/0064357 A1* | 3/2010 | Baird et al. | 726/6 |
| 2010/0070561 A1* | 3/2010 | Dhoolia et al. | 709/203 |
| 2010/0121859 A1* | 5/2010 | Maeda et al. | 707/748 |
| 2010/0122258 A1* | 5/2010 | Reed et al. | 718/102 |
| 2010/0257470 A1* | 10/2010 | Ari et al. | 715/764 |
| 2011/0112885 A1* | 5/2011 | Rijhsinghani et al. | 705/7.25 |
| 2011/0131448 A1* | 6/2011 | Vasil et al. | 714/19 |
| 2011/0191383 A1* | 8/2011 | Addala et al. | 707/797 |
| 2011/0218842 A1* | 9/2011 | Addala et al. | 705/7.39 |
| 2011/0238458 A1* | 9/2011 | Purcell et al. | 705/7.27 |
| 2011/0246991 A1* | 10/2011 | Lu et al. | 718/100 |

OTHER PUBLICATIONS

Sean Carey, "The BPEL Cookbook: Making BPEL Processes Dynamic", Aug. 18, 2009, Oracle technology network, (Carey_08182009.pdf, pp. 1-8).*

(Continued)

*Primary Examiner* — Emerson Puente
*Assistant Examiner* — Hiren Patel
(74) *Attorney, Agent, or Firm* — Fliesler Meyer LLP

(57) ABSTRACT

An extensible process design provides an ability to dynamically inject changes into a running process instance, such as a BPEL instance. Using a combination of BPEL, rules and events, processes can be designed to allow flexibility in terms of adding new activities, removing or skipping activities and adding dependent activities. These changes do not require redeployment of the orchestration process and can affect the behavior of in-flight process instances. The extensible process design includes a main orchestration process, a set of task execution processes and a set of generic trigger processes. The design also includes a set of rules evaluated during execution of the tasks of the orchestration process. The design can further include three types of events: an initiate process event, a pre-task execution event and a post-task execution event. These events and rules can be used to alter the behavior of the main orchestration process at runtime.

16 Claims, 12 Drawing Sheets

(56) References Cited

OTHER PUBLICATIONS

Fang et al., "Dynamic Support for BPEL Process Instance Adaptation", 2008 IEEE International Conference on Services Computing, (Fang_2008.pdf, pp. 327-334).*

Michelle M. Hepner, "Dynamic changes to workflow instances of web services", The University of Tulsa 2007, (Hepner_2007.pdf, pp. 1-131).*

Karastoyanova et al., "Extending BPEL for Run Time Adaptability" Proceedings of the 2005 Ninth IEEE international EDOC Enterprise Computing Conference, (Karastoyanova_2005.pdf, pp. 1-12).*

* cited by examiner

US 8,572,618 B2

EVENT DRIVEN CHANGE INJECTION AND DYNAMIC EXTENSIONS TO A BUSINESS PROCESS EXECUTION LANGUAGE PROCESS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to process execution languages and more particularly for dynamically injecting changes into a running process instance.

BACKGROUND

With the widely achieved popularity of Web Services and Service Oriented Architectures (SOA), business process execution and management systems are becoming more and more widely used in organizations. Large business enterprises typically need to integrate their data, applications and processes into a single and unified system. For example, many organizations need to automate business processes by employing a computer to perform certain activities that span multiple systems and applications, such as receiving sales orders, sending notifications to clients, reminding human participants of work that needs to be performed and the like.

Business Process Execution Language (BPEL) and Business Process Management (BPM) systems have become increasingly important solutions to many organizations in this endeavor. For example, BPEL is a standard executable orchestration language that specifies interactions with Web Services. The BPEL processes are written in extensible markup language (XML) and these processes orchestrate synchronous and asynchronous services into end-to-end flows. By implementing software tools like BPEL, enterprises are able to increase productivity, performance, profits, decrease inefficiency due to various factors and otherwise optimize various tasks.

Even with the rising popularity of these business process systems, however, there exists a multitude of shortcomings and other needs in this area of technology. For example, static BPEL processes typically follow the paths defined during the process design time. Some variations to the process may be possible by using business rules and conditional activities, however, these paths need to be known in advance. Any variations to the process generally require redeployment of the process and apply to only new process instances. On many occasions, however, long running processes need to be modified for various reasons and such changed processes would then typically need to be redeployed, causing complications with the in-flight process instances. What is needed is a way to develop extensible processes that can be dynamically changed at runtime without a need of redeployment and it is desirable that these changes be immediately effective.

DETAILED DESCRIPTION

Figure 1:
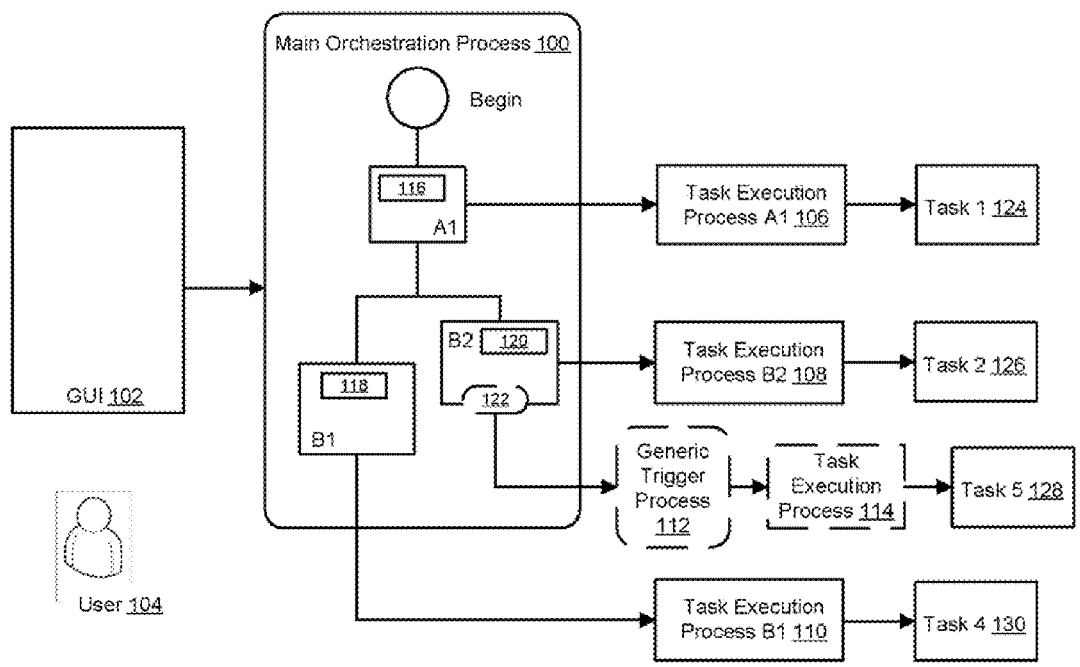
FIG. 1 is an illustration of a system utilizing the extensible process design, in accordance with various embodiments of the invention.

In various embodiments, there is described an extensible process design that provides the ability to dynamically inject changes into a running process instance, such as a business process execution language (BPEL) process instance. Using a combination of BPEL, rules and events, processes can be designed in such a manner that they allow flexibility in terms of adding new activities, removing or skipping activities, updating activities and adding dependent activities. These changes do not require redeployment of the orchestration process and can affect the behavior of in-flight process instances.

In one embodiment, the extensible process design is comprised of at least three types of processes: the main orchestration process, a set of task execution processes and one or more generic trigger processes. The orchestration process is the main process that is generated according to a user-specified definition. This process includes the set of activities and tasks for carrying out a particular business process of an enterprise. The task execution processes, on the other hand, contain the logic to carry out each of the tasks in the orchestration process and to evaluate the associated rules. For example, the task execution process can perform the task by either initiating a human workflow for end user tasks, or a web service call for system automated tasks. Each activity in the main orchestration process is preceded by a rule invocation to determine the task execution conditions. The rule can determine whether the task should be executed or not and if the task should be executed, then whether it should do so immediately or wait for a specific period of time or another task to complete.

Once the main orchestration process is deployed, a generic trigger process is used to inject (make) changes to the main orchestration process at runtime. This generic trigger process can trigger specific processes at a specific time or when a specific event occurs. In one embodiment, instances of this process are initiated from the user interface whenever a change is made to the main orchestration process. In one embodiment, these trigger processes are generic BPEL processes that are deployed to the server when a user installs the manager for the orchestration process. The trigger process can be used to handle changes done after the orchestration process has started. In one embodiment, there are two types of trigger processes: broadcast trigger process and join trigger process. A broadcast trigger process triggers (starts or initiates) one or more tasks whenever the triggering event happens while a join trigger process waits for events specified in the join condition to occur so as to trigger (start or initiate) one or more tasks. Tasks are executed via Task Execution Process. Task Execution Process is a generic mechanism to execute any tasks. Trigger processes handle 1:n and m:1 mapping relationships between tasks respectively. Any one of the processes can be used for 1:1 mapping relationships between tasks. Also, Broadcast trigger process and join trigger processes can be used together to establish an m:n relationship.

An event is an occurrence of a situation. Events are raised when a situation like completion of task execution occurs. According to one embodiment, an event can be raised declaratively or programmatically using any API provided by the eventing mechanism. In a generic sense, an event is a message that is sent when a situation occurs. Such events are subscribed or received by receivers like BPEL in this case.

A message to a running BPEL process can be received by the BPEL process using constructs like receive, onMessage and onEvent provided by the BPEL specifications. These entry points to a BPEL process are exposed via Web Services. BPEL engine providers also connect their eventing or messaging frameworks to these entry points so that events or messages can be received by a running BPEL process. The eventing framework support subscription filters to deliver events to BPEL and BPEL can further narrow the delivery to a specific instance of the process using correlationSet functionality specified by BPEL specification.

The event subscription is conditional based on the content of the event payload (also referred as a message). In various embodiments, the extensible process design further includes three types of events: an initiate process event, a pre-task execution event and a post-task execution event. These events and rules are used to alter the behavior of the main orchestration process. Each of these events can carry a payload that contains certain information associated with the event. For example, the initiate process event is used to initiate specific processes and the payload passed in this event contains the name or identifier of the process that is to be initiated. The pre-task execution event is raised before a particular task is executed. The payload in this event contains information about the actual task that is going to be executed and the process that raised this event. Similarly, the post-task execution event is raised after a task is executed and contains a payload carrying information about the executed task and the process that invoked the event.

In various embodiments, the main orchestration process can be defined by using a graphical user interface (GUI). The definition specifies a sequence of tasks and activities that will be executed in a particular path or order. In one embodiment, the process definition is defined using BPEL and is stored as a file on a computer, such as an extensible markup language (XML) document. After the definition has been created, it can be executed by a BPEL process engine in order to generate a main orchestration process instance.

In one embodiment, each task of the orchestration process invokes a separate task execution process. Each of these tasks can have a skip flag, which will be checked when the task execution process is called from the main orchestration process. If the skip flag is set to YES, the task execution process will go directly to the end and return a signal that the execution of the task has been skipped as output. In one embodiment, the skip flag is only activated, when user deletes an existing task in the orchestration process or when user changes dependencies of an existing task. In one embodiment, the task execution process is invoked by an initiate process event and executed by a process engine, such as a BPEL engine. Once the event initiates the process, the engine can raise the pre-task execution event. A hook can be provided to inject custom functionality upon detection of the pre-task execution event. After this event has been raised, the engine can check a skip flag associated with the task in order to determine whether the particular task should be skipped. In one embodiment, the skip flag can be implemented as a Boolean value, which if true, indicate that the particular task should be skipped. The skip flag can thus be used to skip or remove specific tasks from the orchestration process after it has been deployed and running.

If the skip flag is not activated, the engine can raise the post-task execution event. Once again, the post-task execution event can provide a hook for injecting custom functionality or trigger other processes after the process has been deployed.

After the orchestration process is deployed and running, a user may make changes to the running process by employing the extensible process design. In one embodiment, the user can modify the running orchestration process via the GUI by adding an activity, removing an activity, changing the order or sequence of the activities, repeat an activity, or change various dependencies of the activities in the process. For example, to remove an activity from the process, the user can set a flag which indicates to the engine that the activity should not be executed. Once the flag is changed, the engine will stop executing that particular activity.

To add an activity, a new instance of the generic trigger process can be started (in other words a trigger process instance will be initiated). The payload values for this generic trigger process would specify the activation time and the new task execution process that is to be invoked at that time. Once the engine reaches the specified time, it will automatically initiate the generic trigger process which will invoke the new task, all without re-deploying the main orchestration process.

To change the order of activities or to move an activity from one place in the process to another, a combination of the add and remove changes can be used. For example, a flag can be set to indicate that the particular activity should be skipped (not executed) and a generic trigger process can be used to execute the activity in a different place in the process, thereby changing its sequence. The various changes to the main running process will be illustrated in further detail, however, it should be noted that these examples are provided purely for purposes of illustration and are not intended to limit all of the embodiments of the invention.

FIG. 1 is an illustration of a system utilizing the extensible process design, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a user 104 can define a main orchestration process 100 using any interface, such as a graphical user interface (GUI) 102 by specifying the flow of the process and the various dependencies among its tasks. Once the definition is obtained, an instance of the process can be executed by using a process engine. For example, in one embodiment, the process is a BPEL process that is defined by a business process developer and executed by a BPEL engine. In various embodiments, the artifacts for the main orchestration process can include a BPEL definition file, an XML schema definition for the process, a Web Services Description Language (WSDL) document that can be used to publish the process, various events definition files, configuration information files, as well as various other artifacts. In one embodiment, the main orchestration process uses three basic flows supported in the BPEL engine to schedule tasks in a deployment according to the user-specified dependencies. These three flows are sequential (where tasks are executed in sequence), parallel (where tasks are executed in parallel) and switch (where tasks switch from one to another).

Each activity or task in the orchestration process (e.g. 124, 126, 130) can be invoked by a generic task execution process (106, 108, 110) to carry out the logic for the task. In one embodiment, each task execution process is a generic asynchronous BPEL process that is called in the main orchestration process via a web service call or triggered by an event from the generic trigger process. It can take a task identifier (ID) as an input parameter, call a system automated task or invoke a human task to execute an end user task. Thereafter, the task execution process can publish post task events depending on whether the task completed successfully or not. In one embodiment, the return value is the task execution success flag.

In one embodiment, each task further includes a skip flag (116, 118 and 120) which is checked by the engine when the task execution process is invoked from the main orchestration process. When the skip flag is activated, the task execution process can go directly to the end of the task and return skipped as output indicating that the task was not executed. In one embodiment, the skip flag can be activated when a user wants to delete an existing task from a running process instance or when the user changes the dependencies of an existing task.

In various embodiments, the tasks of the orchestration process can further include a pre-task execution event and a post-task execution event. These events can provide hooks for injecting functionality into a running process. The functionality can include adding a new task or updating a particular task or moving a task from one place in the process to another.

For example, as illustrated in this figure, a post task execution event 122 is used to add a new task execution process 114 to a running instance of the main orchestration process 100. In one embodiment, the user can invoke a new task execution process 114. A new instance of the generic trigger process 112 will be started. In one embodiment, the payload for this trigger process can set the initiate activity event type to the new process 114 and can specify that the new process will be fired off when activity B2 is completed. In other embodiments, the generic trigger process can start the new task at a specified time or day, or upon some other determined event. The new task execution process executes the new task 128 that is added to the main orchestration process.

In various embodiments, the user can also change the ordering of the tasks in the orchestration process at runtime by using the techniques describe above. For example to move the activity A1 to execute after task B1 (not shown), the user would set the flag of A1 to skip the activity and initiate the generic trigger process after the post task execution event of B2 to execute an instance of A1. All of this can be done without changing or redeploying the main orchestration process.

Figure 2:
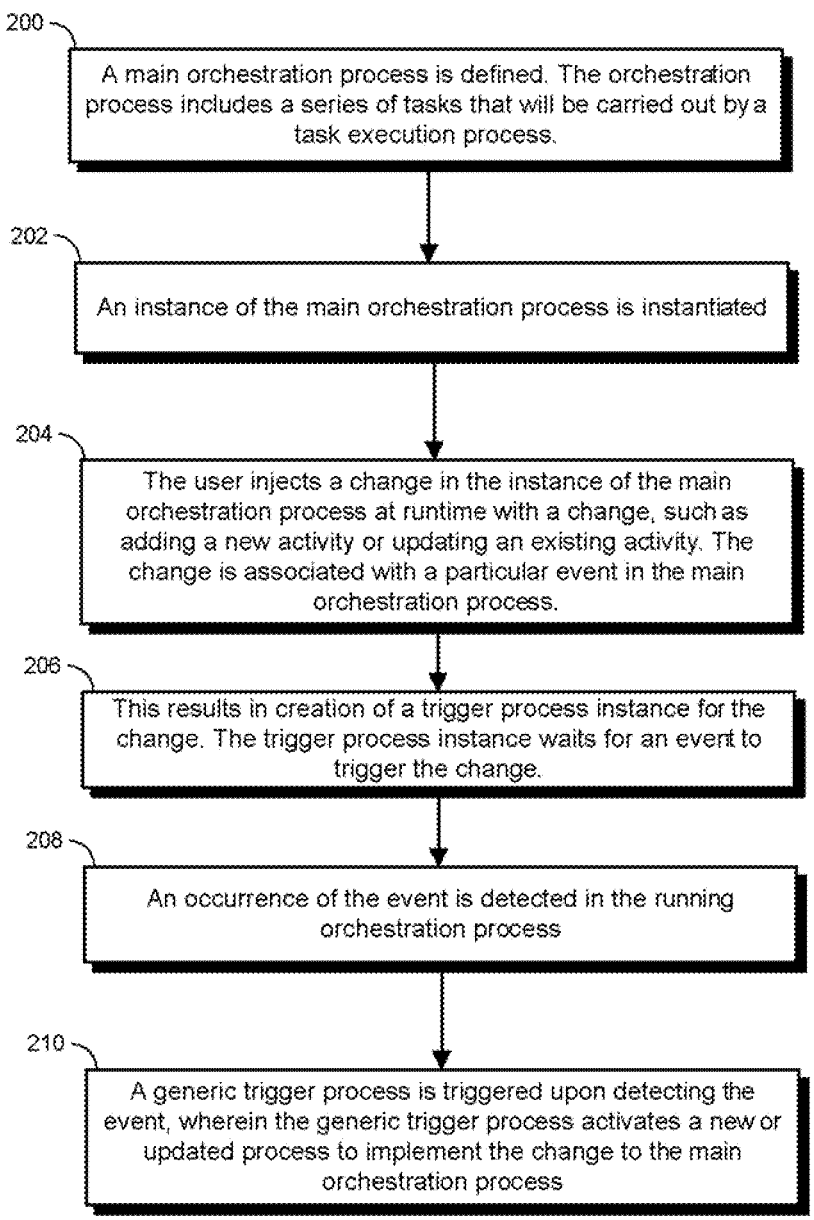
FIG. 2 is a flow chart diagram of the high level process for using an extensible process design, in accordance with various embodiments of the invention.

FIG. 2 is a flow chart diagram of the high level process for using an extensible process design, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 200, a main orchestration process can be defined. The orchestration process includes a series of tasks that will be carried out by one or more task execution processes. These processes can invoke the web services for performing automatic tasks or can call on human tasks to perform end user tasks. The user defined BPEL definition can be stored as an XML file on a computing device. In step 202, an instance of the main orchestration process can be instantiated by deploying it on a BPEL engine.

Once the main orchestration process has been deployed, it does not change. The main orchestration process remains same. The tasks in the main orchestration process continue raising pre and post events. When a user wants to inject a change (step 204), the user identifies the event that would be raised in the main orchestration process (by the Task Execution process) and initiates a trigger process instance for the change. Thus, the change is associated with a particular event (or events in the case of join condition) in the main orchestration process. For example, the new task can be associated with a post-task execution event of a particular task in the orchestration process.

Once the change is made by initiating a trigger process (step 206), an occurrence of the event in the running orchestration process would be detected by the triggering process, as shown in step 208. At this time, in step 210, the generic trigger process can be triggered upon detecting the event, wherein the generic trigger process activates a new or updated process to implement the change to the main orchestration process. For example, the generic trigger process can activate a new task execution process to perform a new task being added to the orchestration process.

Figure 3:
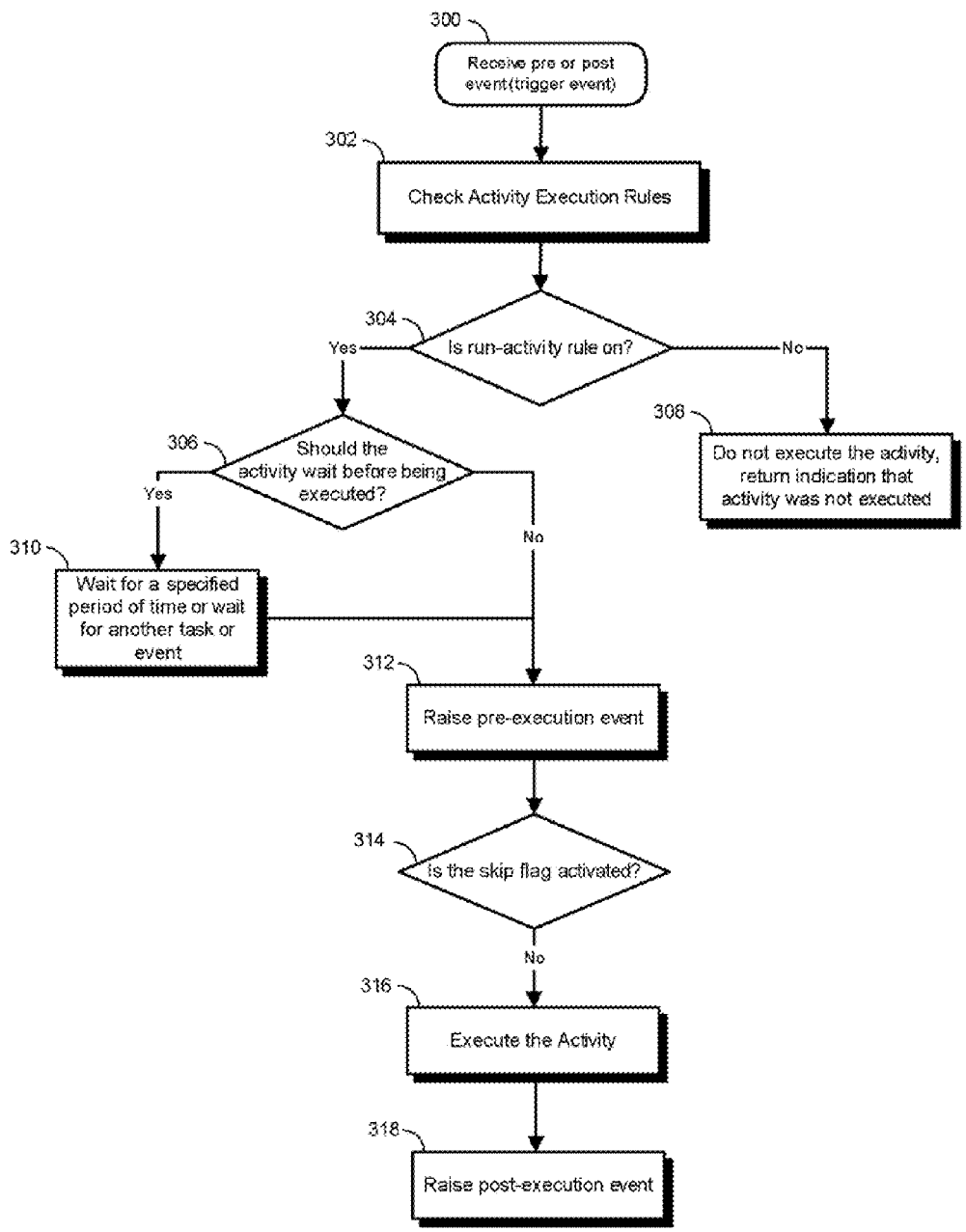
FIG. 3 is a flow chart diagram of the execution block for each task in the orchestration process, in accordance with various embodiments of the invention.

FIG. 3 is a flow chart diagram of the execution block for each task in the orchestration process, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 300, a task execution process could be instantiated by an initiate-process event or a service call. If the task is initiated via a service call, then some activity execution rules can be examined first to determine the behavior of the task, as shown in step 302. The rules can decide whether to skip the task or execute it. If the task is executed, it may start immediately or wait for a specific period of time. The task can also wait for completion of a related process that started based on the pre-task event.

In step 304, the engine can determine whether the run activity rule is set to on or off. As shown in step 308, if the rule is set to off, the engine does not execute this activity and returns an indication that it was not executed. If the rule is on, the engine can then determine whether the activity should wait before being executed, as shown in step 306. If the activity should wait, the engine can wait for a specified period of time or wait for another task or event, as shown in step 310.

In step 312, the engine can raise a pre-task execution event. This event can cause the execution of another process if the other process is waiting for the event at runtime. In step 314, the skip flag can be checked to determine whether to skip this particular task. If the skip flag is off, the task is executed (step 316) and after its execution is finished, the post-task execution event can be raised. Once again, this post-task execution event can cause the execution of new processes and tasks once the main orchestration process is deployed and changed at runtime. The new tasks or processes would be initiated by a generic trigger process illustrated in the following FIGS. 4 and 5.

Figure 4:
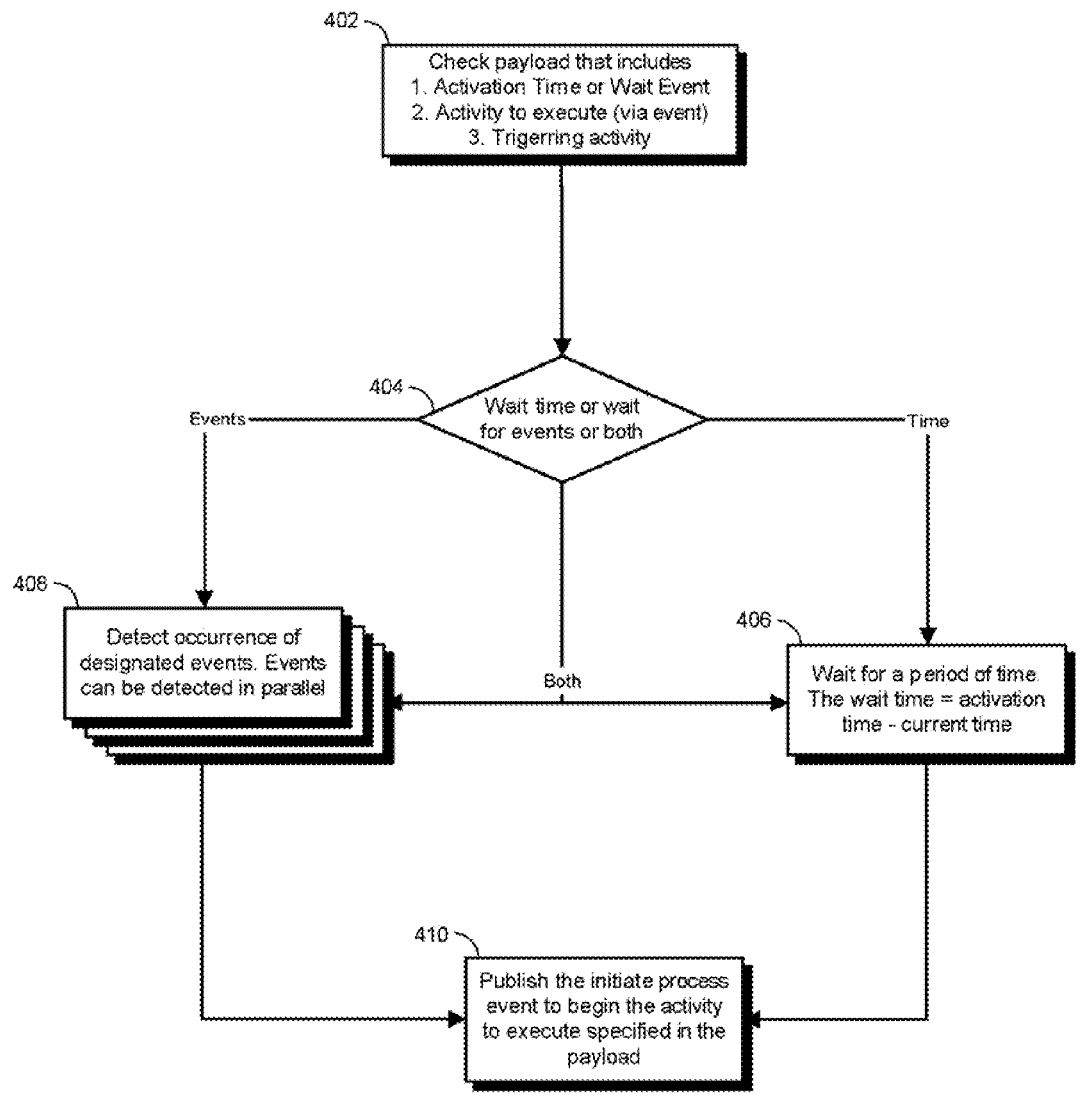
FIG. 4 is a flow chart diagram of the execution of a join trigger process, in accordance with various embodiments of the invention.

FIG. 4 is a flow chart diagram of the execution of a join trigger process, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As previously mentioned, there can be two types of generic trigger processes in the extensible process design—a join trigger process and a broadcast trigger process. The join trigger process addresses the many-to-one task mapping and the broadcast trigger process addresses the one-to-many task mapping. This figure illustrates the functionality of the join trigger process.

As shown in step 402, when the join trigger process is initiated, it can contain a payload carrying certain information. In one embodiment, event payload includes the Activation Time and/or Wait Event; the activity to execute (via event); and the triggering activity. This payload is inspected and depending on the information contained therein, the trigger process waits for either a specified time or the specified events to occur (or both), as shown in step 404. If the payload specified a time, the trigger process waits until the time is reached according to the equation wait time=activation time−current time (as shown in step 406). If the payload specifies particular events, the trigger process waits for each of those events to be published, as shown in steps 408. Once all of the events are detected or when the time reaches the specified point, the trigger process can publish the initiate process event to begin the activity to execute specified in the payload, as shown in step 410.

This trigger process can be useful for adding tasks and for reordering tasks. The process can wait for any already known activities. If there is a new type of activity added for which there is a dependency, then a new version of this process can be deployed. However, deploying a new version of this process need not affect any existing instances.

Figure 5:
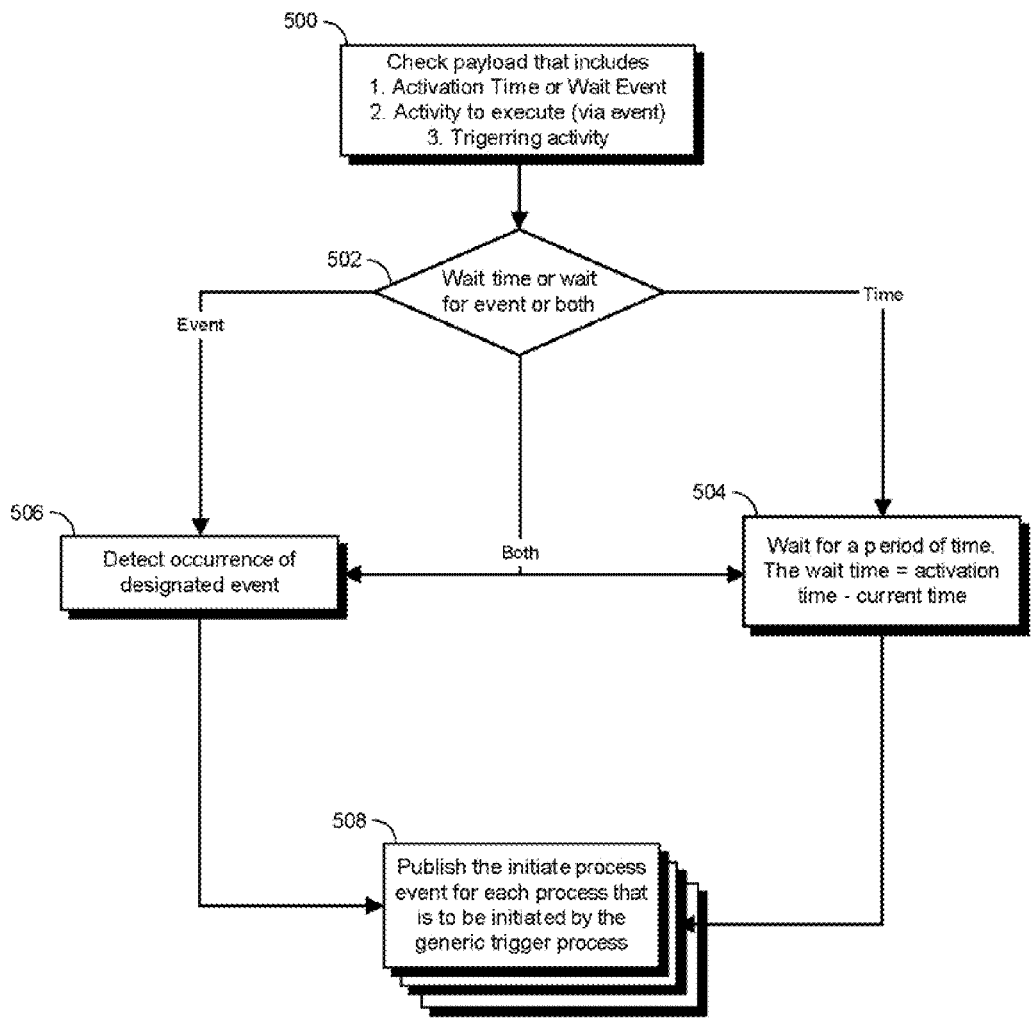
FIG. 5 is a flow chart diagram of the execution of a broadcast trigger process, in accordance with various embodiments of the invention.

FIG. 5 is a flow chart diagram of the execution of a broadcast trigger process, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

Similarly to the process illustrated in the previous figure, the payload can be inspected and the trigger process can wait either for a specific time or event or both, as shown in steps 500, 502, 504 and 506. However, in the broadcast trigger process may wait for only one task to be completed (one event) and can trigger a set of multiple tasks to be executed, as shown in step 508. In various embodiments, the broadcast trigger process handles one-to-many type mapping between predecessor tasks and successor tasks, such that the broadcast trigger process waits for the predecessor task to complete and then publishes a complete task event for each successor task that will be started by the broadcast trigger process.

FIGS. 6A-6G are illustrations of some use cases of utilizing the extensible process design, in accordance with various embodiments of the invention. Although these diagram depicts a particular set of use cases, it should be noted that the invention described and claimed throughout this specification is not necessarily limited to any these use cases. As will be evident to one or ordinary skill in the art, a multitude of other use cases and implementations exist and can be utilized within the scope of the invention.

Figure 6A:
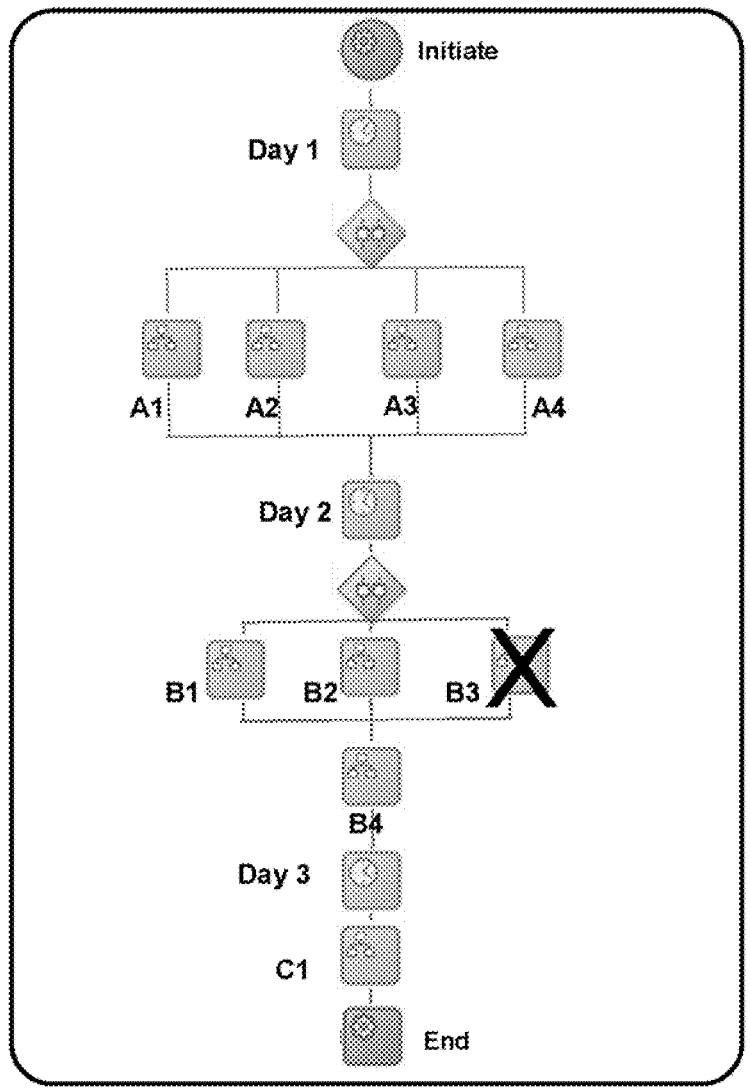
FIGS. 6A-6G are illustrations of some use cases of utilizing the extensible process design, in accordance with various embodiments of the invention.

As shown in FIG. 6A, a user can use the extensible process design to remove an activity from a process. As shown in this figure, the process may be executing in Day 1, and the user may decide to delete the task B3 which is scheduled to execute on Day 2. In one embodiment, day is a calendar day that is specified using any scheduler activity in a process like BPEL activity called 'wait'. In one embodiment, each activity has an execution rule in the subprocess, which specifies whether this task should be executed or not. In this case, the value of the activity execute flag can be turned to "OFF" by the user and this would not require the process to be redeployed. The activity B3 would then be removed from the process, while all other activities (A1-A4, B1-B2, and C1) would remain unchanged and running in the orchestration process.

Figure 6B:
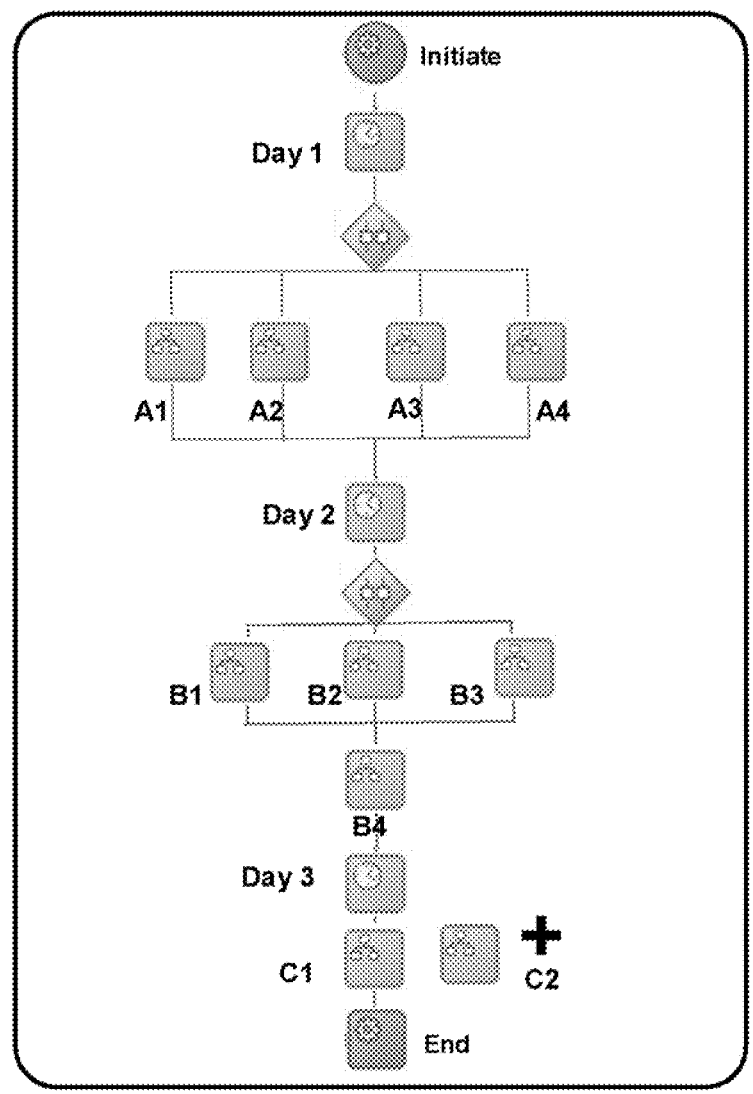

As shown in FIG. 6B, a task can be added in parallel to C1 on Day 3. In this illustration, the process is executing on Day 1 and a user decides to add a new task C2 to be executed on Day 3. Since this is a new task, a new instance of the trigger process will be started. After C2 is deployed, a new instance of the trigger process can be started. The payload for this trigger process would be Activation_time=Day3 and initiate_activity_event type=C2. This would ensure that when Day 3 starts, an event is raised to initiate C2. Once again the main orchestration process would not need to be redeployed to implement this change.

Figure 6C:
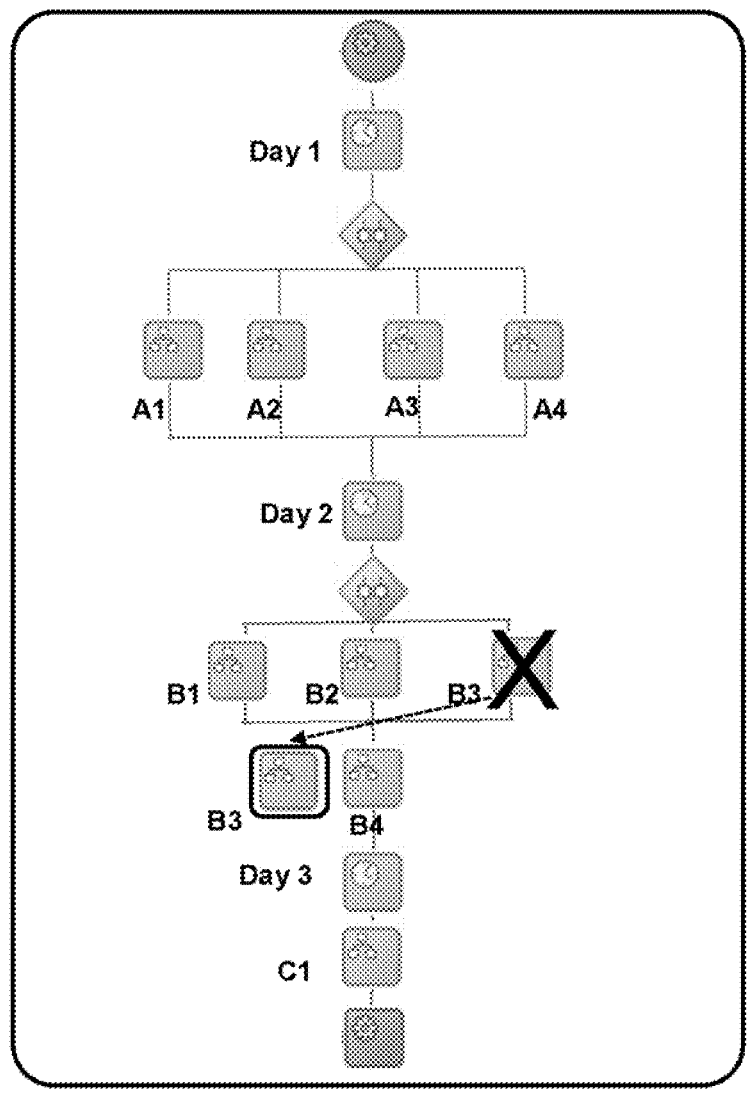

As shown in FIG. 6C, a task can be moved so that it executes after another task. In this illustration, the process is executing on Day 1 and the user may decide to execute task B3 after task B2 is completed. As previously mentioned, since each activity has an execution rule, the value of the activity execute flag n this rule can be turned to OFF. This can ensure that B3 will not execute at its old point in the process. Subsequently, a new instance of the trigger process can be started with the payload that specifies the wait event to be post-task execution event associated with task B2. The payload would also specify that the initiate activity event would be the task B3.

Figure 6D:
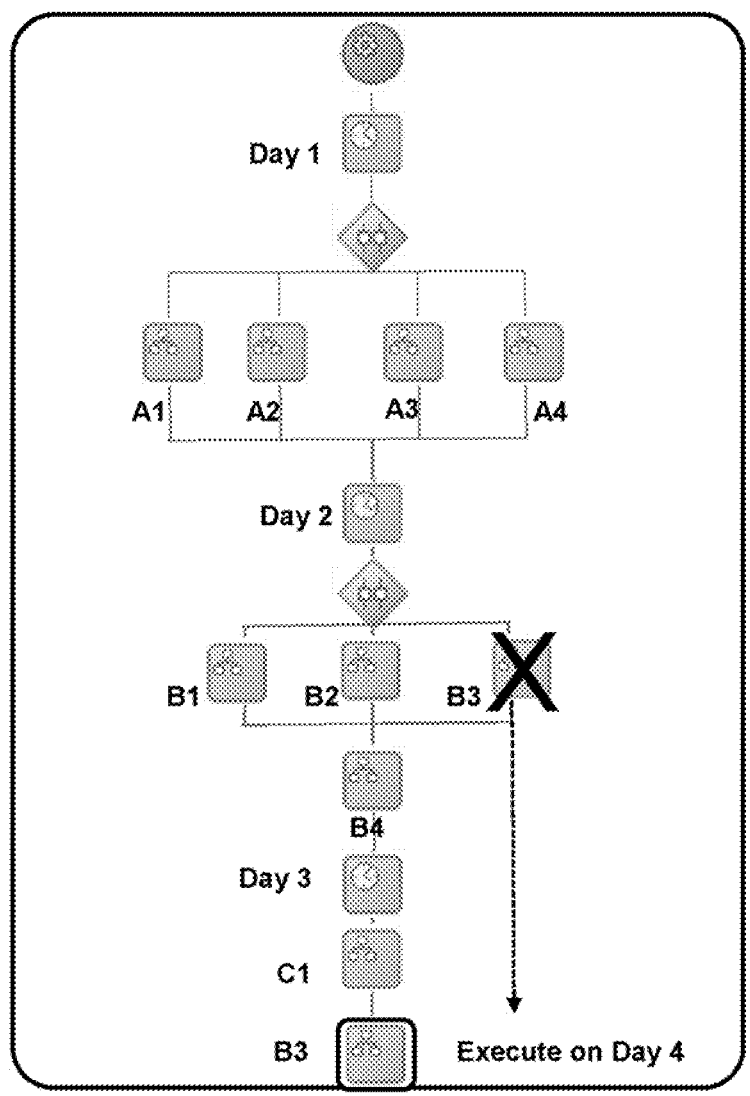

As shown in FIG. 6D, a task can be moved so that it executes at a different time or on a different day from where it is currently scheduled. In this illustration, the process instance is executing on Day 1 and the user decides to execute task B3 on Day 4. As previously described, the user first sets the activity execute flag to OFF. Then a new instance of the trigger process can be started with the activate time set to Day 4 and the initiate process specified as B3. This would initiate a new instance of B3 on Day 4, without redeploying the main orchestration process.

Figure 6E:
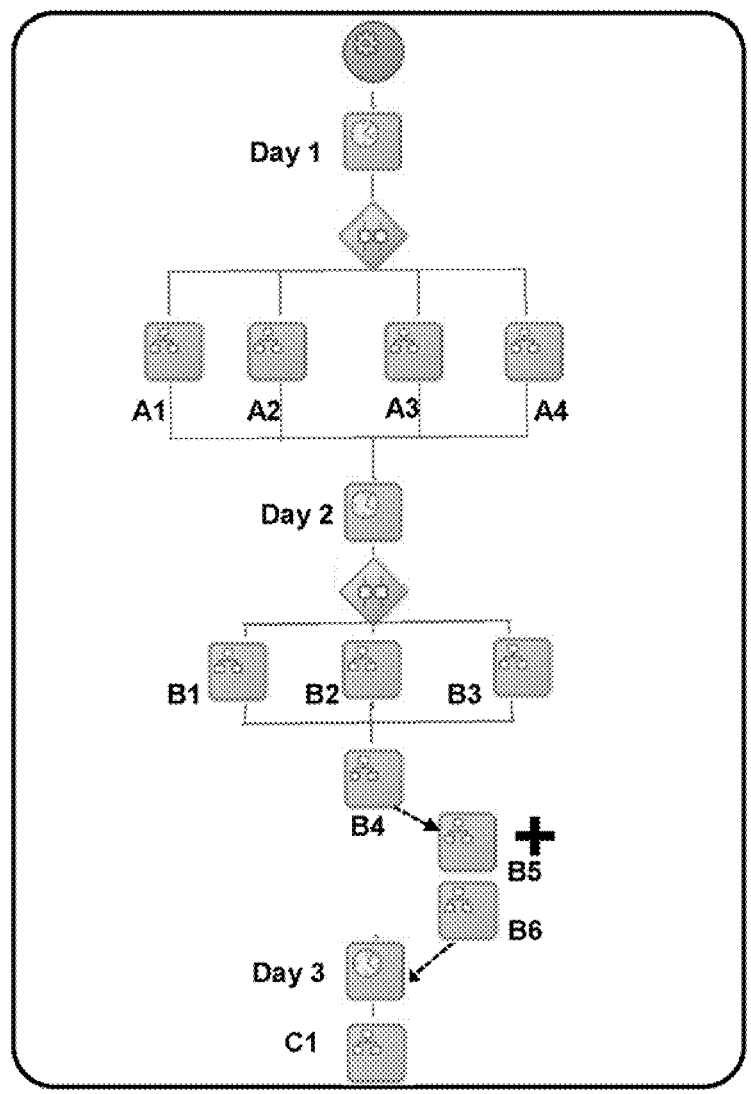

As shown in FIG. 6E, one or more new tasks can be inserted after a particular existing task in the process. In this illustration, the process is executing on Day 1 and the user may decide to add new tasks B5 and B6 to be executed after B4 on Day 2. To add B5, a new instance of the trigger process can be started. The payload for this would specify to wait for the post-task execution event associated with task B4 and the initiated activity to be specified as B5. This would ensure that when B4 completes, then B5 would be executed. Similarly, to add the new task B6, a new instance of the trigger process is started. This version would include the events for B5 and B6 in the switch block (since these processes were not known in advance when the trigger process was generated. The payload of this trigger process specifies waiting for the post-task execution event associated with task B5. The initiating activity would be specified as B6. This would ensure that when B5 completes, then B6 is executed.

Figure 6F:
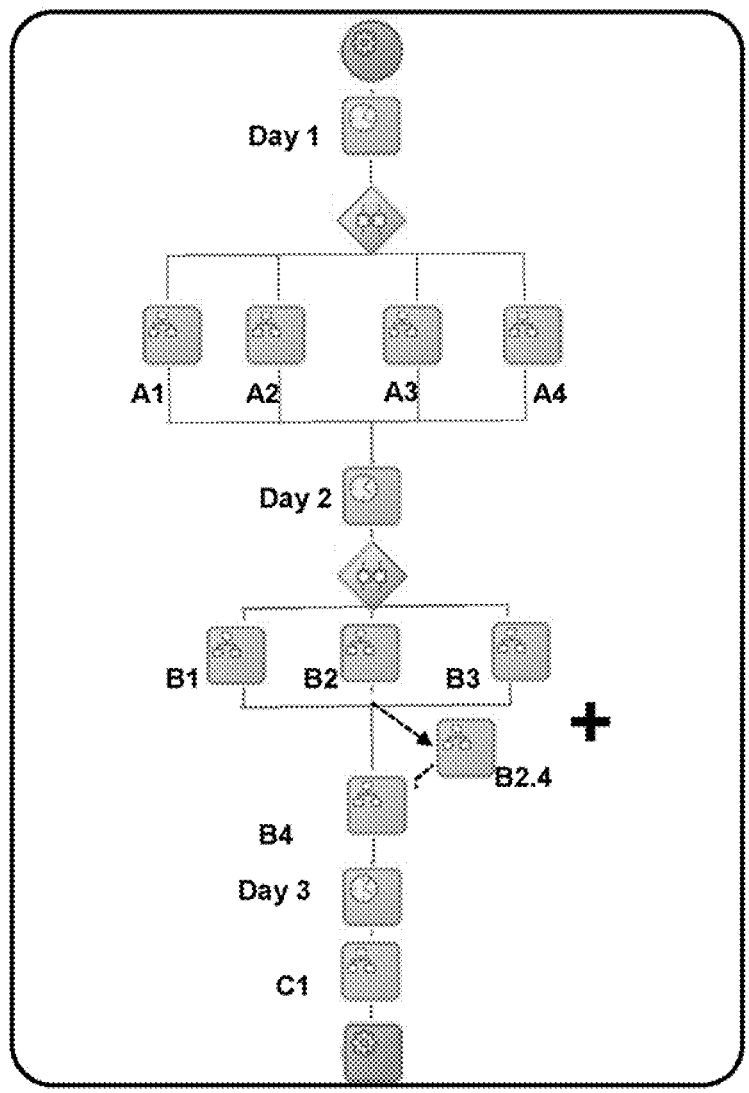

As shown in FIG. 6F, a new task can be inserted between multiple tasks executing on the same day with a dependency being added to the existing tasks. In this illustration, the process is executing on Day1. At this point, the user may decide to add a new task B2.4 between B2 and B4 on Day2. This is the most complicated scenario since a new task is added and a dependency on that task is also added from an existing task. Since this is a new task, a new task execution process for B2.4 needs to be initiated. This can be done by starting a "new instance" of the trigger process, where the payload values for this would be "Wait_Event=Pre_B4_Exec_event" and "initiate_activity_event type=B2.4." The triggering_activity attribute in the Pre_B4_exec_event would contain the value B4. The rules for B4 would need to change in order to indicate that wait_event=True.

This would ensure that B2.4 is started before B4 executes. Also the rule change to B4 would force the process to wait till B2.4 completes. It should be noted that in order to support this pattern, the Task Execution Process needs to have a conditional flag for pre-execution-wait that can be turn on or off during the runtime to inject the change. Once the flag is turned true, the Task waits till the newly inserted task completes and fires a completion event that also includes the ID of the next activity that might be waiting on the completion. Thus, as shown in the FIG. 6F, the task execution process would need to have a conditional flag wait_event that is initially false and if it is set to true at runtime, the process waits for post_exec_event with triggering_event=B4 for that task id (B4 in this case). Since the new task B2.4 is external with respect to the process, B4 would wait until it is referred to by name in order to resume. Thus, when the task B2.4 completes, it would re-activate the B4 task so that the process can resume.

Figure 6G:
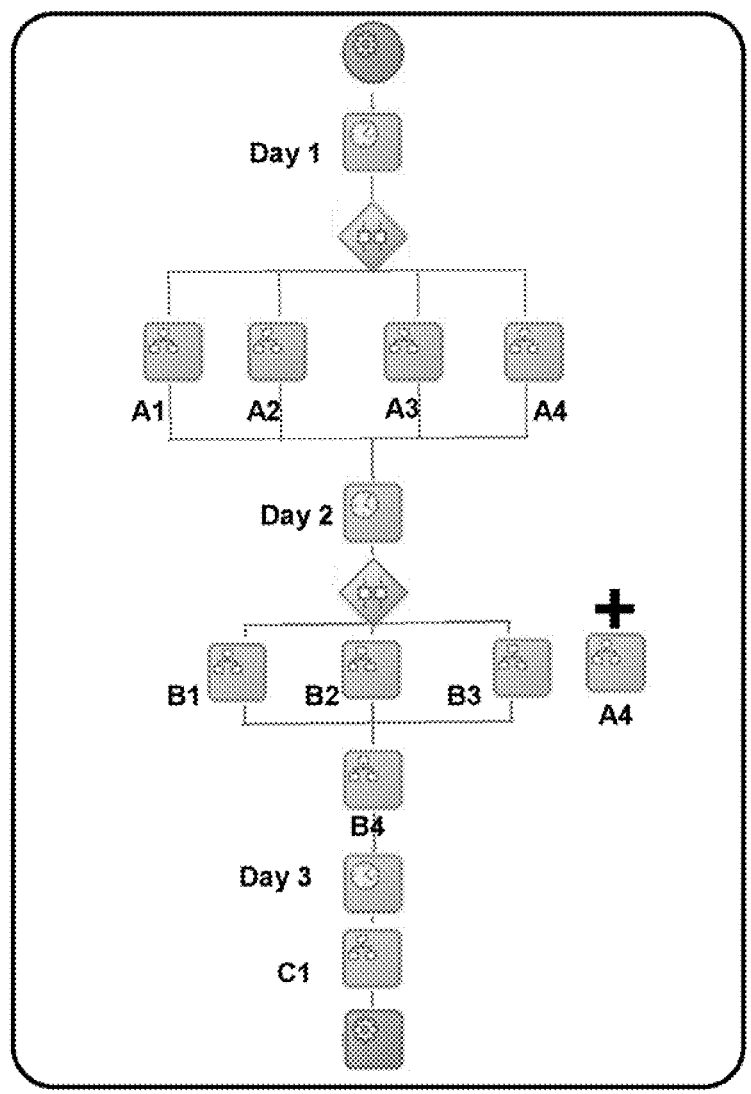

As illustrated in FIG. 6G, a task can also be re-run at a different time or day. In this illustration, the process is executing on Day and A4 is in progress or has already completed. The user may then decide that A4 should be re-executed on Day 2. A new instance of the trigger process can then be started and the payload would specify the activation time to be Day 2 and the activity to initiate to be A4. This would ensure that when Day 2 starts, the task A4 is executed again, without having to redeploy the orchestration process.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing dynamic injection of changes into a running process, said method comprising:
   providing a process designer component that includes a main orchestration process, one or more generic trigger processes, and a plurality of task execution processes, wherein the main orchestration process includes a series of tasks, wherein each task in the series of tasks includes a flag and is to be executed by a separate task execution process that contains logic to execute said each task,
   wherein said each task is initiated by an initiate process event, raises a pre-task execution event, checks the flag associated with the each task, executes an activity if the flag is not activated and then raises a post-task execution event, and
   wherein one of the one or more generic trigger processes is a broadcast trigger process that handles one-to-many type mapping between one or more predecessor tasks and one or more successor tasks, such that the broadcast trigger process waits for the one or more predecessor tasks to complete and then publishes a complete task event for each of said successor tasks that will be started by the broadcast trigger process;
   receiving a definition of a flow of the main orchestration process and dependencies among the series of tasks of said main orchestration process;
   executing an instance of the main orchestration process without affecting the main orchestration process;
   receiving one or more changes, via a graphical interface, to the flow of the instance of the main orchestration process at runtime without modifying the main orchestration process, wherein the one or more changes include one or more of adding a task, updating a task, removing or skipping a task, re-ordering the series of tasks, and modifying a task dependency;

associating each of the one or more changes with an event in the main orchestration process, wherein a message associated with the event is sent to the main orchestration process, which subscribes to the event;

initiating one of the one or more generic trigger processes that waits for an occurrence of the event; and upon detecting the occurrence of the event, implementing the one or more changes by controlling the flag of each of the tasks associated with the one or more changes.

2. The method of claim 1, wherein the one or more changes affect the executing instance of the main orchestration process without re-deploying said main orchestration process.

3. The method of claim 1, wherein the event includes one or more of an initiate process event, a pre-task execution event and a post-task execution event.

4. The method of claim 1, wherein the task execution process first checks the flag before executing said each task to determine whether to skip said each task.

5. The method of claim 1, wherein said each task in the main orchestration process is preceded by a rule invocation to determine whether said each task should execute or not, and if said each task should execute, whether said each task should be executed immediately or wait for a specified period of time or for another task to complete.

6. The method of claim 1, wherein the generic trigger process is the broadcast trigger process that waits for only one of the one or more predecessor tasks to complete before triggering execution of the one or more successor tasks.

7. The method of claim 1, wherein the main orchestration process is a business process execution language (BPEL) process executed by a BPEL engine.

8. The method of claim 1, wherein the main orchestration process supports at least three basic flows including sequential flow, parallel flow and switch flow.

9. A system for providing dynamic injection of changes into a running process, said system comprising:

a process designer component executed on one more microprocessors that includes a main orchestration process, one or more generic trigger processes, and a plurality of task execution processes, wherein said main orchestration process including a series of tasks, wherein each task in the series of tasks includes a flag and is to be executed by a separate task execution process that contains logic to execute said each task, wherein said each task is initiated by an initiate process event, raises a pre-task execution event, checks the flag associated with the each task, executes an activity if the flag is not activated and then raises a post-task execution event, and wherein one of the one or more generic trigger processes is a broadcast trigger process that handles one-to-many type mapping between one or more predecessor tasks and one or more successor tasks, such that the broadcast trigger process waits for the one or more predecessor task to complete and then publishes a complete task event for each of said successor tasks that will be started by the broadcast trigger process;

a process engine that executes an instance of the main orchestration process without affecting the main orchestration process, which includes a definition of a flow of the main orchestration process and dependencies among the series of tasks of said main orchestration process;

an interface used to receive one or more changes to the flow of the instance of the main orchestration process at runtime without modifying the main orchestration process, wherein the one or more changes include one or more of adding a task, updating a task, removing or skipping a task, re-ordering the series of tasks, and modifying a task dependency;

wherein each of the one or more changes is associated with an event in the main orchestration process and one of the one or more generic trigger processes is initiated and waits for an occurrence of the event, wherein a message associated with the event is sent to the main orchestration process, which subscribes to the event;

wherein upon detecting the occurrence of the event by the generic trigger process, the process engine is operable to implement the one or more changes by controlling the flag of each of the tasks associated with the one or more changes.

10. The system of claim 9, wherein the one or more changes affect the executing instance of the main orchestration process without re-deploying said orchestration process.

11. The system of claim 9, wherein the event includes one or more of an initiate process event, a pre-task execution event and a post-task execution event.

12. The system of claim 9, wherein the task execution process first checks the flag before executing said each task to determine whether to skip said each task.

13. The system of claim 9, wherein said each task in the main orchestration process is preceded by a rule invocation to determine whether said each task should execute or not, and if said each task should execute, whether said each task should be executed immediately or wait for a specified period of time or for another task to complete.

14. The system of claim 9, wherein the generic trigger process is the broadcast trigger process that waits for only one of the one or more predecessor tasks to complete before triggering execution of the one or more successor tasks.

15. The system of claim 9, wherein the main orchestration process supports at least three basic flows including sequential flow, parallel flow and switch flow.

16. A non-transitory computer-readable storage medium encoded with one or more sequences of instructions for providing dynamic injection of changes into a running process, said instructions when executed by one or more processors causing the one or more processors to perform the steps comprising:

providing a process designer component that includes a main orchestration process, one or more generic trigger processes, and a plurality of task execution processes, wherein the—main orchestration process includes a series of tasks, wherein each task in the series of tasks includes a flag and is to be executed by a separate task execution process that contains logic to execute said each task, wherein said each task is initiated by an initiate process event, raises a pre-task execution event, checks the flag associated with the each task, executes an activity if the flag is not activated and then raises a post-task execution event, and wherein one of the one or more generic trigger processes is a broadcast trigger process that handles one-to-many type mapping between one or more predecessor tasks and one or more successor tasks, such that the broadcast trigger process waits for the one or more predecessor tasks to complete and then publishes a complete task event for each of said successor tasks that will be started by the broadcast trigger process;

receiving a definition of a flow of the main orchestration process and dependencies among the series of tasks of said main orchestration process;

executing an instance of the main orchestration process without affecting the main orchestration process;

receiving one or more changes, via a graphical interface, to the flow of the instance of the main orchestration process at runtime without modifying the main orchestration process, wherein the one or more changes include one or more of adding a task, updating a task, removing or skipping a task, re-ordering the series of tasks, and modifying a task dependency;

associating each of the one or more changes with an event in the main orchestration process, wherein a message associated with the event is sent to the main orchestration process, which subscribes to the event;

initiating one of the one or more generic trigger processes that waits for an occurrence of the event; and upon detecting the occurrence of the event, implementing the one or more changes by controlling the flag of each of the tasks associated with the one or more changes.

* * * * *

UNITED STATES PATENT AND TRADEMARK OFFICE
CERTIFICATE OF CORRECTION

| | | |
|---|---|---|
| PATENT NO. | : 8,572,618 B2 | Page 1 of 1 |
| APPLICATION NO. | : 12/776064 | |
| DATED | : October 29, 2013 | |
| INVENTOR(S) | : Kand et al. | |

It is certified that error appears in the above-identified patent and that said Letters Patent is hereby corrected as shown below:

In the Drawings

On sheet 5 of 12, in figure 5, under Reference Numeral 504, line 1, delete "p eriod" and insert -- period --, therefor.

In the Claims

In column 12, line 50, in Claim 16, delete "wherein the—" and insert -- wherein the --, therefor.

Signed and Sealed this
Third Day of June, 2014

Michelle K. Lee
*Deputy Director of the United States Patent and Trademark Office*